R. D. GRANGER.
Cooking Stove.
No. 27,047.
Patented Feb. 7, 1860.
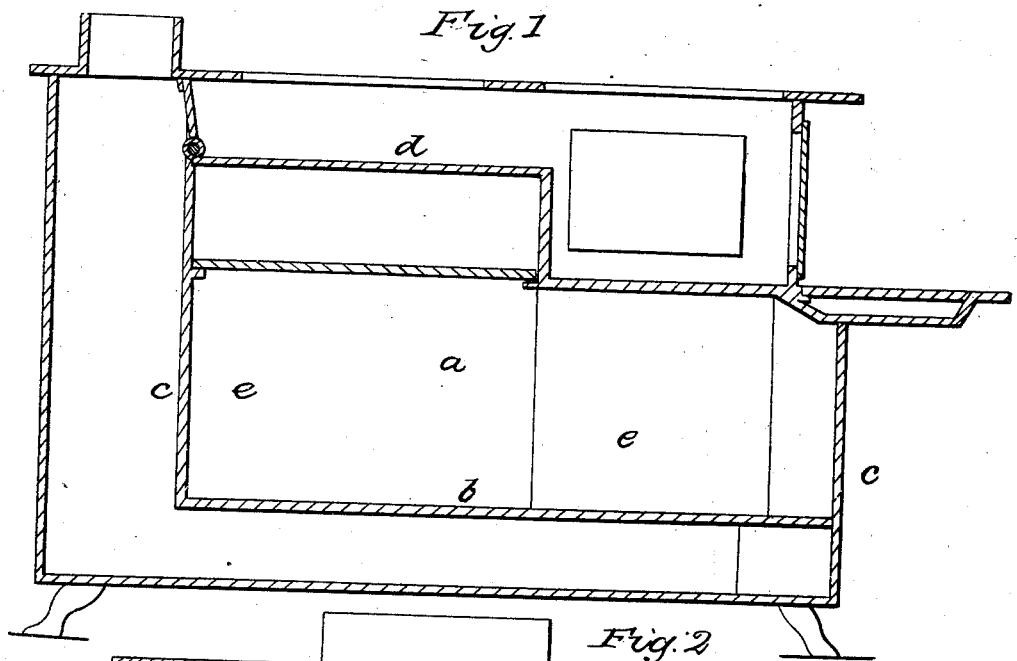
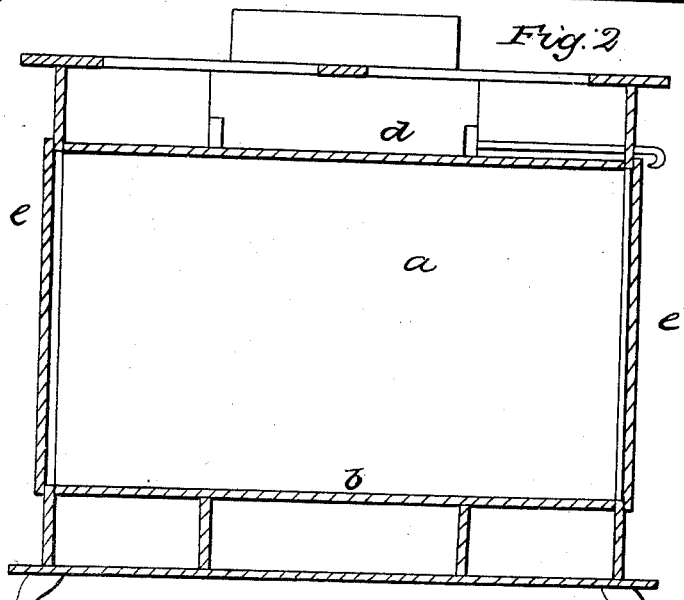

UNITED STATES PATENT OFFICE.

R. D. GRANGER, OF ALBANY, NEW YORK.

COOKING STOVE AND RANGE.

Specification of Letters Patent No. 27,047, dated February 7, 1860.

*To all whom it may concern:*

Be it known that I, R. D. GRANGER, of Albany, in the State of New York, have invented a new and useful Improvement in Cooking Stoves and Ranges; and I do hereby declare that the following is a full, clear, and exact description thereof, reference being had to the accompanying drawings, making part of this specification, in which—

Figure 1, is a longitudinal vertical; and Fig. 2, a cross vertical section of a cooking stove with my improvement applied thereto.

The same letters indicate like parts in both the figures.

My said invention consists in making the bottom and the other plates, including the doors, of ovens for cooking stoves and ranges of enameled iron with the enameled surface inside, by means of which such plates are prevented from being corroded by the action of substances baked or cooked in such ovens or which fall on or against the surface of such ovens from vessels put therein, while at the same time by reason of the non-conducting property of the enamel the heat imparted is rendered more equable than when the inner surface is made of iron. However the oven (*a*) of a cooking stove or range may be formed all the plates constituting such oven, such as the bottom (*b*), ends (*c, c*), top (*d*), and doors (*e, e*) are all of them first enameled on that surface which is to form the inner surface of such oven. The mode of enameling such plates it is not necessary to describe as it is to be done in the usual manner of enameling iron.

It is well known that many if not all the substances which are usually baked or cooked in ovens, contain more or less acid; and that when placed directly onto the oven bottom, or when falling from a vessel onto the oven bottom or are splashed against the inner surface of any other plate of an oven, that they have a tendency to, and do rapidly corrode the iron, and that this tendency is greatly increased by the heat to which such substances are subjected in the process of baking. And it is also well known that by reason of the porous nature and unavoidable roughness of the surface of cast iron, such substances falling thereon in a heated state become so strongly incrusted that it is very difficult to remove them, and the continued action of the heat on such incrusted substances, often produces an odor which is not only offensive, but, until thoroughly removed, continues to impart offensive flavors to other articles baked or cooked. All these difficulties are avoided by my improvement, for by reason of the enameled coating the inside of the oven presents a vitreous surface which is proof against the action of acids, and which prevents all substances coming in contact therewith from incrusting and adhering thereto, so that it can be readily removed.

Another important advantage of my improvement is due to the fact that enamel although a good radiator is a very imperfect conductor of heat, while iron is a better conductor than radiator of heat, and from this it follows that an oven with the inner surface of iron, will impart heat very rapidly to the portion of any substance which is in contact with it and less rapidly to such portions as are not in contact. This evil has long been known. By my improvement I avoid this evil in a great measure for the heat will be imparted more by radiation than by conduction, and hence that part of substances placed on the buttom of the oven will not be so liable to be over heated as it would be in an oven with an inner iron surface.

It will be obvious from the foregoing that it is more important to have the bottom plate of an oven enameled than the other plates, and therefore I do not wish to be understood as limiting my claim of invention to the making of ovens with all the plates thereof enameled on the inner surface, although it will be best so to apply my said invention.

What I claim as my invention is—

Making the ovens of cooking stoves and ranges, with one or more of the plates thereof, made of cast iron with the inner surface thereof enameled, substantially as and for the purpose set forth.

R. D. GRANGER.

Witnesses:
HENRY W. BLISS,
JAMES A. GREIG.